No. 669,100.  
P. M. RANDALL.  
PHYSICIAN'S ELECTRIC LAMP.  
(Application filed May 16, 1900.)  
Patented Mar. 5, 1901.

(No Model.)

Witnesses:  
Raphaël Netter  
Alexander Mitchell

Purdy M. Randall, Inventor

UNITED STATES PATENT OFFICE.

PURDY M. RANDALL, OF NEW YORK, N. Y., ASSIGNOR, BY MESNE ASSIGNMENTS, TO THE UNIQUE ELECTRIC DEVICE COMPANY, OF SAME PLACE.

PHYSICIAN'S ELECTRIC LAMP.

SPECIFICATION forming part of Letters Patent No. 669,100, dated March 5, 1901.

Application filed May 16, 1900. Serial No. 16,948. (No model.)

*To all whom it may concern:*

Be it known that I, PURDY M. RANDALL, a citizen of the United States, residing at the city of New York, in the borough of Manhattan, county of New York, and State of New York, have invented a new and useful Improvement in Physicians' Electric Lamps, of which the following, taken in connection with the accompanying drawings, is a specification.

My invention relates in particular to electric lamps for use of physicians, surgeons, and dentists. Its object is to provide a lamp, a suitable handle, and current-controlling device connected with a source of electric current, whereby a physician may explore the various passages of the body which are comparatively inaccessible and which cannot be lighted by ordinary means and may at all times have the flow of the electric current wholly under control, and to construct all these devices in a compact and portable form suitable to be carried in the physician's pocket.

My invention consists generally in a source of electrical energy, suitable means for removably connecting to said source flexible and preferably insulated current-carrying wires, an adjustable and separable handle of peculiar construction, means for controlling the flow of the current, the lamp, or other device to be operated by the electric current, and a peculiarly-constructed case to contain these devices, and its novelty lies in the construction of the parts hereinafter more particularly described and claimed.

My apparatus may of course be used for various purposes which involve the use of an electric current under the circumstances above suggested other than that of lighting. For example, surgical instruments operated by electricity may be attached at the end of my handle instead of an electric lamp.

Figure 1:
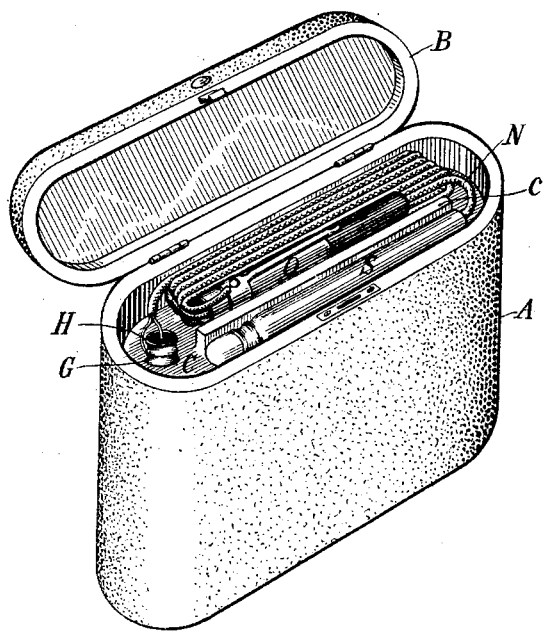
Figure 2:
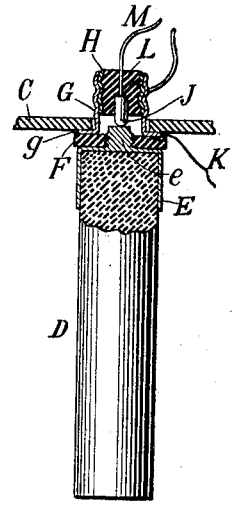
Figure 3:
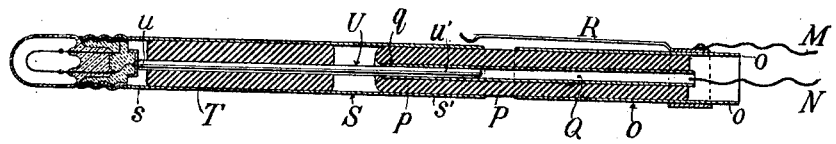
Figure 4:
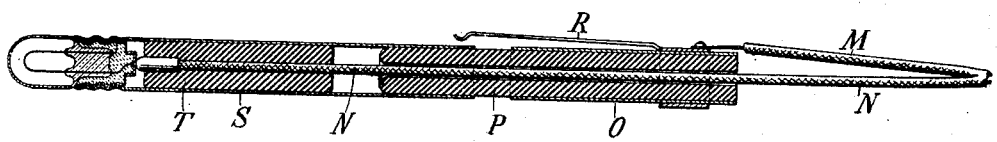

Figure 1 is a perspective view of the case in which I inclose a series of batteries, the cover being open, so as to show the arrangement of the parts of my device when detached and folded in the case. Fig. 2 is a vertical section of a connecting device attached to the top of one element of a battery. Fig. 3 is a longitudinal section of the preferred form of separable handle. Fig. 4 is a similar view of a modified form of such handle.

A is a case made of any suitable material and shaped compactly to surround and contain one or more electric batteries of any usual construction. In the form shown it is somewhat deeper than the length of the batteries, thus leaving space above the batteries to put away the separated parts of the device. B is a cover for said case. When the batteries are placed inside of the case, they are covered and are held firmly in place by the cover and by an insulated horizontal partition C, which has a raised portion $c$, extending part way along its median line. The object of this raised portion of the partition is to prevent contact between the two portions of the handle when they are separated and placed in the case, as hereinafter described. The separating and insulating partition and pockets to hold the detached parts of the handle may in some instances be located inside of the cover B. The case may be of any suitable shape or size to contain one or more batteries, and the insulated compartments to contain the separated portions of the handle may be otherwise placed than as shown—for instance, may be vertical.

Any suitable means of connecting the wires with the source of electrical energy may be used. I prefer, however, the arrangement shown in Fig. 2, in which D represents one element of a battery.

E is a cap of conducting material fitting on the upper end of the battery element. Preferably this cap has at its upper central portion a raised projecting head $e$, which is threaded.

F is a washer of insulating material, which is preferably screwed down upon the head $e$, leaving the upper portion of the head projecting above the upper surface of the washer. Attached to the upper surface of the washer in any suitable manner is a hollow sleeve G, of conducting material. The sleeve G here shown has an exterior flange $g$ at its lower end to assist in attaching the sleeve to the washer. The inner diameter of the sleeve is such that there is no contact between it and the projecting head $e$, which is surrounded by the sleeve G. This sleeve is preferably threaded interiorly. Into this sleeve is removably fitted a plug, which is composed of a shell H, which is filled with an insulating material L, through the center of which passes a wire or rod M, of conducting material, terminating at its lower end in a projecting contact-piece J, also of conducting material. When the plug H is screwed or otherwise fitted into the sleeve G, the contact-piece J comes in contact with the top of the head e. The wire M after it leaves the plug H is preferably insulated and connects with one portion of the separable handle of my device, as afterward described.

K is a wire which makes connection between the opposite element of the battery from that to which the cap E is fitted and the sleeve G, said wire being connected with the sleeve in any suitable way. The cap E may be fitted to either element of the battery, and the wire K should be connected with the opposite element. Where more than one battery is used, the batteries should be connected in series.

When the connecting parts E, F, G, and H are put together, as above described, there will be electrical connection from the element D through the cap E and its head e, the plug J, and the wire M to one portion of the handle. There will also be electrical connection from the opposite battery element through the wire K, the sleeve G, the shell of the plug H, and through a wire N, suitably connected with said shell H, to the other portion of the handle. The wire N is also preferably insulated. In placing the battery or batteries in the case A in the manner above described the partition C fits on top of the washer F and the flange g of the sleeve G. Thus all parts of the battery and the battery connection are beneath the partition C, except the sleeve G and the plug H. I make no claim for the construction of this electrical connection in the present application, as I have made the same the subject of a separate application for Letters Patent to be prosecuted simultaneously herewith.

The preferred form of my detachable handle is shown in Fig. 3. It consists of a shell O, made of a conducting material, within which is contained a tube P, of insulating material, which in turn contains a tube Q, of conducting material. The shell O may be of any desired length, however short. The tubes P and Q are of the same length and both project beyond one end of the shell O, as is shown in Fig. 3 at p and q. At the other end the shell O, as here shown, projects beyond the ends of the inclosed tubes P and Q, as shown at o o; but this is not necessary. The wire N is attached to the interior tube Q and the wire M is attached to the shell O, or vice versa. The shell O is provided with a spring-tongue R, of conducting material, which extends lengthwise of the shell and beyond its end. The other portion of my handle consists of a conducting-shell S of substantially the same diameter as the shell O. It also contains an insulating-tube T, beyond the ends of which, however, the shell S extends, as shown at s and s'. The insulating-tube T carries a conducting-rod U, which projects beyond both ends of the insulating-tube, as shown at u and u'. The extension s' of the shell and u' of the rod should be of the same length as or slightly greater length than the projection p of the tube P. In order to connect the two portions of my handle, the projecting portion of the shell S is thrust over the projecting portion of the tube P. At the same time the projecting end of the rod U enters the tube Q. Thus electrical connection is made from the wire N through the tube Q and the rod U to any conductor which may be attached to the end of the said rod. No electrical connection, however, is made between the shell S and the shell O until the shell S is pushed upon the projecting tube P far enough to come in contact with the shell O. At the opposite end of the shell S and rod U is placed an electric lamp or any other device to which it is desired to conduct the current from the batteries, one pole of such device being connected in any suitable manner with the rod U and the other pole with the shell S. When the shell S is pushed into contact with the shell O, a complete circuit is made from the batteries through the wire N, the tube Q, the rod U, the lamp or other device at the end of the rod U, the shell S, the shell O, and the wire M. When the shell S is pulled out of contact with the end of the shell O but still remains on the projecting end of the tube P, the handle remains intact, but the current is broken. By pressing down the free end of the spring-tongue R the circuit is again completed, the connection being through the shell S, the spring-tongue R, and the shell O. The two parts of the handle may thus be connected so as to permit of a steady flow of the electric current or may be so connected that the current shall flow only when the operator who holds the handle presses down the spring-tongue R. The shells O and S are preferably of small diameter and of considerable length, but may be made of any suitable size or shape desired. If it is desired to lengthen the handle, this may be done by inserting between the two parts hereinabove described one or more sections similar to such parts. If desired, the handle may be made flexible by using suitable material and suitably arranging the conducting devices, the general construction of the parts, however, remaining the same. When this device is not in use the shell S may be detached from the tube P, and may be placed on one side of the elevated portion of the insulating partition in the case containing the batteries. The shell O is placed on the opposite side of the partition, and the insulated wires M and N are folded within the case. The cover is then closed and the entire apparatus is thus contained in a small and compact packet suitable to be carried in the pocket of the operator.

Fig. 4 represents a modified form of my detachable handle. It consists of the shells O and S, which inclose, respectively, the tubes P and T, all of which are of the same construction as in the modification shown in Fig. 3. Instead of the tube P inclosing conducting-tube Q and the tube T inclosing a conducting-rod U the wire N is carried directly through the tubes P and T and is connected with one pole of the lamp or other device which is to be attached to the handle. The insulated partition in the case is of especial use when this form of handle is separated and placed in the case, as ordinarily the shell O will remain strung upon the wire N even when separated from the shell S.

It is obvious that my separable handle may be used either with or without the spring-tongue R; but the use of the spring-tongue is desirable, as it enables the operator more easily to control and regulate the current.

It is to be noted that the plug H may be easily and quickly detached from the sleeve G when desired. It will not be necessary, however, to detach these parts when the device is not in use, so long as the handle is separated.

Having thus described my invention, what I claim as new, and desire to secure by Letters Patent, is—

1. A separable handle for conveying and controlling an electric current consisting of a conducting-shell connected with one pole of a source of electric energy, said shell containing an insulating-tube one end of which projects beyond the end of the shell; and also having connected therewith a contact device for making intermittent electric connection with a second conducting-shell when not in contact with the first shell; a second conducting-shell containing an insulating-tube, the end of this shell, however, projecting beyond the end of the tube, said parts being so adapted that the projecting shell may be pushed upon the projecting tube so as to form a rigid but separable handle either with or without bringing the ends of the conducting-shells in contact, and a conducting connection from the other pole of the source of electrical energy passing through both of the insulating-tubes, substantially as set forth.

2. A separable handle for conveying and controlling an electric current, consisting of a conducting-shell connected with one pole and the source of electric energy, said shell containing an insulating-tube, one end of which projects beyond the end of the shaft; a second conducting-shell containing an insulating-tube, the end of this shell projecting beyond the end of the tube; said parts being so adapted that the projecting shell may be pushed upon the projecting tube so as to form a rigid but separable handle either with or without bringing the ends of the conducting-shells in contact; and a conducting connection from the other pole of the source of electrical energy passing through both of the insulating-tubes, substantially as set forth.

3. A separable handle for conveying and controlling an electric current consisting of a conducting-shell connected with one pole of a source of electric energy, said shell containing an insulating-tube one end of which projects beyond the end of the shell, and said insulating-tube in turn containing a conducting-tube the end of which also projects beyond the end of the shell and the other end of which is connected with the other pole of the source of electric energy; a second conducting-shell containing an insulating-tube which in turn contains a conducting-rod, said shell and said rod projecting beyond the end of said tube, and said shell being adapted to be pushed over the projecting insulating-tube, and said rod being adapted to be projected into the conducting-tube, thus forming a rigid but separable handle; and means whereby an electrical connection may be established and broken at will between the two shells when in position as a handle but when not in actual contact, substantially as set forth.

4. A separable handle for conveying and controlling an electric current, consisting of a conducting-shell connected with one pole of a source of electric energy, said shell containing an insulating-tube, one end of which projects beyond the end of the shell, and said insulating-tube in turn containing a conducting-tube, the end of which last projects beyond the end of the shell and the other end of which is connected with the other pole of the source of electric energy; a second conducting-shell containing an insulating-tube which in turn contains a conducting-rod, said shell and said rod projecting beyond the end of said tube, and said shell being adapted to be pushed over the projecting insulating-tube and said rod, being adapted to be projected into the conducting-tube, thus forming a rigid but separable handle, substantially as set forth.

5. A portable apparatus containing devices for producing conveying and controlling electric current for lighting or other purposes, consisting of an electric battery, a separable handle one end of which is adapted to receive a lamp or other operative device, electric conductors for conveying the current from the battery through the handle, and a case for said battery having insulated compartments for the separated portions of said handle, substantially as set forth.

PURDY M. RANDALL.

Witnesses:
JAMES N. CATLOW,
JOHN N. MOORE.